INVENTORS
BURWELL SPURLOCK
ROBERT L. JACOBSON

BY

ATTORNEYS 3,507,780
STARTUP PROCEDURE FOR A LOW CONTENT PLATINUM RHENIUM-IRIDIUM CATALYST REFORMING PROCESS
Burwell Spurlock, Lafayette, and Robert L. Jacobson, Pinole, Calif., assignors to Chevron Research Company, San Francisco, Calif., a corporation of Delaware
Continuation-in-part of application Ser. No. 671,329, Sept. 28, 1967. This application Apr. 7, 1969, Ser. No. 813,880
Int. Cl. C10g 35/08
U.S. Cl. 208—138                 3 Claims

ABSTRACT OF THE DISCLOSURE

A reforming process using a catalyst containing 0.01 to 0.3 weight percent platinum, 0.01 to 0.3 weight percent rhenium and 0.001 to 0.1 weight percent iridium associated with a porous solid carrier is started up by contacting the naphtha with the catalyst in the presence of an inert gas, for example, nitrogen. The pressure in the reforming zone should be about 200 p.s.i.g. and the catalyst temperature about 650° F. when the naphtha is first contacted with the catalyst at a space velocity of about 1 v./v./hr. Thereafter, the catalyst temperature is increased to about 90° F. over a 2–3 hour period while building up autogenous pressure of produced hydrogen.

CROSS-REFERENCE

This application is a continuation-in-part of application Ser. No. 671,329, filed Sept. 28, 1967, now Patent 3,449,237.

BACKGROUND OF THE INVENTION

Field

The present invention relates to hydrocarbon reforming processes and more particularly to a method for starting up a reforming process conducted in the presence of a catalyst comprising platinum, rhenium and iridium associated with a porous solid catalyst carrier.

Prior art

A catalyst comprising 0.01 to 0.3 weight percent platinum, 0.01 to 0.3 weight percent rhenium and 0.001 to 0.1 weight percent iridium, supported on a porous solid carrier, has been found to have unexpectedly high yield stability and low fouling rate, as disclosed and claimed in U.S. application Ser. No. 758,673, filed Sept. 10, 1968. However, the catalyst initially possesses high demethanation activity, i.e., the catalyst causes excessive hydrocracking, when initially contacted with hydrogen and a substantially sulfur-free naphtha at reforming conditions; thus, large yields of hydrocarbon gases, e.g., methane and ethane, are produced during the early stages of reforming. During this initial reforming period the selectivity of the catalyst for the production of high octane gasoline is accordingly low. After an initial period of reforming, the demethanation activity of the catalyst decreases to an acceptable level, i.e., to a level at least equivalent to that of a platinum catalyst without rhenium and/or iridium. Thereafter the performance, particularly the stability, of the low platinum-rhenium-iridium content catalyst for production of high grade gasoline is far superior to catalysts with low concentrations of platinum, i.e., 0.01 to 0.3 weight percent, but not continining rhenium and/or iridium.

As a consequence of the high demethanation activity of the low platinum-rhenium-iridium content catalyst, a severe temperature excursion, or heat front, travels through the catalyst bed when naphtha is initially contacted with the catalyst in the presence of hydrogen and at reforming conditions. Although the temperature excursion only exists during the initial period of contact with the naphtha feed such an excursion could be the cause of a temperature runaway in a commercial reforming plant. The temperature in the bed may increase as high as several hundred degrees above the temperature of the naphtha introduced to the reaction zone. Obviously, such a severe temperature increase can damage the reactor and/or catalysts.

SUMMARY OF THE INVENTION

It has been found that the high temperature excursion normally observed when a substantially sulfur-free naphtha and hydrogen are initially contacted with a catalyst comprising 0.01 to 0.3 weight percent platinum, 0.01 to 0.3 weight percent rhenium and 0.001 to 0.1 weight percent iridium associated with a porous solid carrier can be decreased or substantially eliminated by contacting the catalyst preferably in a reduced condition with a substantially sulfur-free naphtha at reforming conditions and in the presence of an inert gas in accordance with the present invention. Thus, the present process for startup of a reforming process conducted in the presence of a low platinum-rhenium-iridium content catalyst, said catalyst containing from 0.01 to 0.3 weight percent platinum, 0.01 to 0.3 weight percent rhenium and 0.001 to 0.1 weight percent iridium, comprises introducing the catalyst into a treating zone, pressuring the treating zone with an inert gas, preferably nitrogen, to about 200 p.s.i.g., heating the catalyst to about 650° F., and contacting the catalyst with a substantially sulfur-free naphtha at a space rate of about one volume of naphtha per volume of catalyst per hour (1 v./v./hr.). A naphtha-inert gas mixture withdrawn from the treating zone is passed into a gas separation zone to separate inert gas from the naphtha, and the separated inert gas is recycled to the treating zone. Over a period of two to three hours, the temperature of the catalyst in the treating zone is raised at a generally uniform rate from about 650° F. to about 900° F. and the naphtha feed rate to the treating zone is gradually increased at a generally uniform rate from a space velocity of 1 v./v./hr. to a space velocity of at least 1.5 v./v./hr. The inert gas flow into the treating zone is gradually decreased over the period of 2 to 3 hours while building up autogenous pressure of produced hydrogen, e.g., by dehydrogenation of naphthenes.

Figure 2:
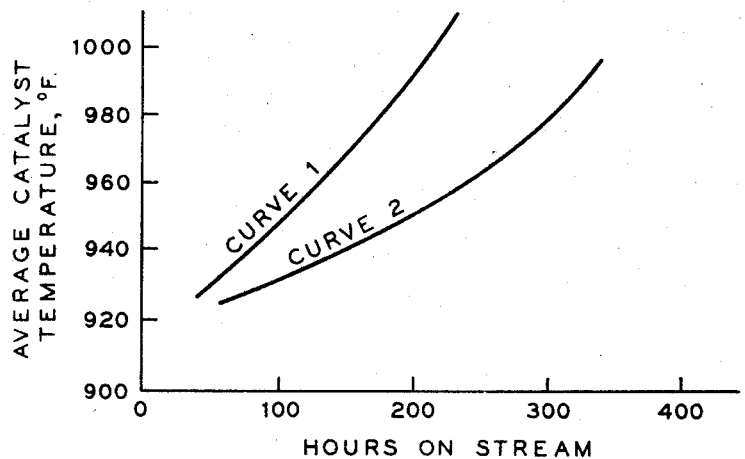
Figure 3:
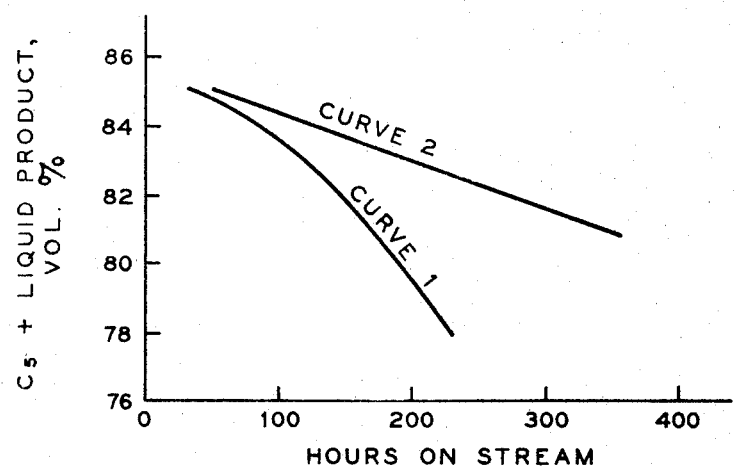

The graphs in FIGURES 2 and 3 show for comparison purposes a reforming process started up on the presence of hydrogen and a process started up in accordance with the present invention using nitrogen as the inert gas. The graph in FIGURE 2 shows the average catalyst temperature required to maintain a 100 F–1 clear octane product as a function of the hours onstream for a reforming process started up in hydrogen (curve 1) and for a reforming process using the startup procedure of the present invention (curve 2). The graph in FIGURE 3 shows, as a function of time onstream, the yield of $C_5+$ liquid product or gasoline having a 100 octane (F–1 clear) rating produced during a reforming process using hydrogen for the startup (curve 1) and for a reforming process using the startup procedure of the present invention (curve 2). It is clear from FIGURES 2 and 3 that the startup procedure of the present invention significantly improves the tempeature stability and the yield stability of the low platinum-rhenium-iridium content catalyst.

DESCRIPTION OF THE INVENTION

The catalyst for use in the present invention comprises a porous solid catalyst carrier or support having associated therewith 0.01 to 0.3 weight percent platinum, 0.01 to 0.3 weight percent rhenium and 0.001 to 0.1 weight percent iridium. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of from 50–700 m.$^2$/gm. The carrier can be a natural or a synthetically-produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silica-alumina-zirconia, silica-magnesia, silica-alumina-magnesia, and crystalline zeoletic aluminosilicates. Generally, however, reforming processes are preferably conducted in the presence of catalysts having low cracking activity, i.e., catalysts of limited acidity. Hence, preferred carriers are inorganic oxides such as magnesia and alumina, particularly high purity alumina.

A particularly preferred catalytic carrier for purposes of this invention is alumina. Any of the forms of alumina suitable as a support for reforming catalysts can be used. Furthermore, alumina can be prepared by a variety of methods satisfactory for the purposes of this invention. The preparation of alumina for use in reforming catalysts is well known in the prior art. Thus, the alumina may be prepared as alumina hydrosol, alumina hydrogel, alumina xerogel, alumina monohydrate, sintered alumina, and the like.

The reforming catalyst comprises the desired porous solid carrier haviing disposed thereon in intimate admixture catalytically active amounts of platinum, rhenium and iridium. The catalyst proposed for use in the present invention comprises platinum in amounts of from 0.01 to 0.3 weight percent and more preferably from 0.01 to 0.2 weight percent based on the finished catalyst. The concentration of rhenium in the final composition is from 0.01 to 0.3 weight percent and preferably from 0.01 to 0.2 weight percent. The iridium concentration in the finished catalyst composition is from 0.001 to 0.1 weight percent and preferably from 0.01 to 0.1 weight percent. The platinum, rhenium and iridium may exist as metals or as compounds on the finished catalyst. Reference to "platinum," "rhenium" and "iridium" is meant to refer to the metallic form or the compound form. The weight percent of the platinum, rhenium and iridium is calculated on the basis of the metal.

Although the components, platinum, rhenium, and iridium can be intimately associated with the porous solid carrier by suitable techniques such as by ion-exchange, coprecipitation, etc., the components are usually associated with the porous solid carrier by impregnation. Furthermore, one of the components can be associated with the carrier by one procedure, e.g., ion-exchange, and the other components associated with the carrier by another procedure, e.g., impregnation. As indicated, however, the components are preferably associated with the carrier by impregnation. The catalyst can be prepared either by coimpregnation of the three components or by sequential impregnation. In general, the carrier material is impregnated with an aqueous solution of a decomposable compound of the metal in sufficient concentration to provide the desired quantity of the component on the finished catalyst; the resulting mixture is then heated to remove water. Chloroplatinic acid is generally the preferred source of platinum. Other feasible platinum-containing compounds, e.g., ammonium chloroplatinates and polyammineplatinum salts, can also be used. Rhenium compounds suitable for incorporation onto the carrier include, among others, perrhenic acid and ammonium perrhenates. Iridium compounds suitable for incorporation onto the carrier include, among others, chloroiridic acid, iridium tribromide, ammonium chloroiridate, iridium trichloride, and ammonium chloroiridite.

It is contemplated in the present invention that incorporation of the components, platinum, rhenium and iridium, with the carrier can be accomplished at any particular stage of the catalyst preparation. For example, if the components are to be incorporated onto an alumina support, the incorporation may take place while the alumina is in the sol or gel form followed by precipitation of the alumina. Alternatively, a previously prepared alumina carrier can be impregnated with a water solution of the metal compounds.

Following incorporation of the carrier material with the proper amount of platinum, rhenium, and iridium, the resulting composite is usually dried by heating at a temperature of, for example, no greater than about 500° F. and preferably at about 200° F. to 400° F. Thereafter the composite can be calcined at an elevated temperature, e.g., up to about 1200° F., if desired. It may be desirable to incorporate one or two components, for example, platinum and rhenium, with the carrier, followed by drying and low temperature calcination, before incorporating the other component.

The present process for bringing the low platinum-rhenium-iridium content catalyst onstream is applicable with freshly prepared catalyst as well as with used catalyst which has been subsequently regenerated, e.g., by heating in an oxygen atmosphere. It is, however, preferable for purposes of the present invention that the catalyst exist in a reduced state prior to contact with the naphtha in the presence of the inert gas. The catalyst comprising platinum, rhenium and iridium can be reduced by heating at an elevated temperature in a reducing atmosphere free of hydrocarbons. The reduction is preferably performed in the presence of hydrogen and more preferably dry hydogen. The platinum, rhenium and iridium are preferably reduced to the metallic state. The reduction can be accomplished at a temperature in the range of, for example, 600° F. to 1300° F. and preferably 600° F. to 1000° F. If the catalyst is not reduced, for example, in hydrogen, prior to contact with the naphtha and inert gas, then the hydrocarbons in the naphtha will act as the reducing agent. Reduction of the low platinum-rhenium-iridium content catalyst by means of hydrocarbons results in a catalyst having low activity and poor stability as compared to a catalyst reduced in a hydrogen atmosphere.

In accordance with the present invention a reforming reactor containing a catalyst comprising 0.01 to 0.3 weight percent platinum, 0.01 to 0.3 weight percent rhenium and 0.001 to 0.1 weight percent iridium supported on a porous solid carrier is pressured to about 200 p.s.i.g. with inert gas. The inert gas should be essentially free of hydrogen or other reactive gases, for example, oxygen. Thus the reactor should be pressured with a gas which is at least 95 volume percent inert. An inert gas for use in the present process is one which has little or no effect upon the reforming operation; that is, it does not react with the hydrocarbon oil or poison the catalyst to the extent that its use is undesirable. Inert gases which can be used for this purpose include, for example, nitrogen, argon, methane, flue gas resulting from the combustion of carbonaceous material with oxygen containing gas, etc. Nitrogen is preferably used as the inert gas in the present process.

The low platinum-rhenium-iridium content catalyst in the reactor is heated to about 650° F. Generally, the catalyst is heated to an elevated temperature during the time that the reactor is being pressured with an inert gas. However, it is contemplated as part of the present invention that the pressuring of the reactor and the heating of the catalyst need not occur simultaneously. That is, the reactor can be brought to a pressure of about 200 p.s.i.g., and then the catalyst brought up to the desired temperature. The inert gas is generally used as the medium to heat the catalyst to a temperature of about 650° F.; that is, the inert gas is heated to an elevated temperature prior to introduction into the reactor. The transfer of heat from the inert gas to the catalyst bed raises the temperature of the catalyst. Other conventional means of heating the catalyst bed can be used if desired, e.g., radiant heating. The inert gas removed from the outlet of the reactor is recycled to the inlet of the reactor. Recycled gas can be further heated for contact with the catalyst.

After a pressure in the reactor of about 200 p.s.i.g. and a catalyst temperature of about 650° F. are reached, a substantially sulfur-free naphtha is contacted with the catalyst at a liquid hourly space velocity (LHSV) of about 1 (1 volume of naphtha per volume of catalyst per hour). The naphtha feed is initially introduced into the reactor in contact with the catalyst at a low space velocity, i.e., a space velocity of about 1 v./v./hr., in order to maintain a high inert gas to feed ratio. A high inert gas to feed ratio is essential during the initial period of contact of the naphtha with the catalyst since the inert gas helps dissipate heat which is produced by hydrocracking or other exothermic reactions. Dissipation of the heat helps prevent further, uncontrollable hydrocracking, which could lead to a temperature runaway. Inert gas and naphtha are withdrawn from the reactor and from contact with the catalyst and are passed to a gas separation zone to separate naphtha from the inert gas. The inert gas is then recycled to the reactor.

Introducing the naphtha into contact with the catalyst when the temperature of the catalyst is about 650° F. and the pressure in the reactor is about 200 p.s.i.g. permits limited reforming of the naphtha, particularly dehydrogenation of naphthenes, while minimizing hydrocracking. Thus, endothermic reactions are favored, while exothermic, or heat producing reactions, are minimized. A catalyst temperature higher than about 650° F. at which to introduce the naphtha into the reactor is undesirable since the extent of hydrocracking increases with increase in temperature. On the other hand, contacting the naphtha with the catalyst at a temperature significantly below 650° F. is not desired. At low temperatures, i.e., substantially below 650° F., practically no reforming of the naphtha occurs; a limited amount of reforming, particularly dehydrogenation of naphthenes, to produce hydrogen is essential. Thus, the catalyst temperature at which to introduce the feed must be high enough to permit sufficient dehydrogenation of naphthenes to produce hydrogen but not so high as to subject the naphtha feed to excessive hydrocracking or to reactions which are adversely influenced in the absence of hydrogen or in the presence of only small quantities thereof. Thus, for purposes of the present process, a catalyst temperature of about 650° F., i.e., a temperature within ±20° of 650° F., permits the desired limited dehydrogenation to occur without adverse reactions, e.g., hydrocracking.

The pressure in the reactor is maintained at about 200 p.s.i.g., i.e., within ±20 pounds of 200 p.s.i.g. when the naphtha is initially contacted with the catalyst. Increasing the pressure above 200 ps.i.g while holding the temperature at about 650° F. severely limits the extent of reforming, particularly dehydrogenation.

After contacting the naphtha with the catalyst at the low space rate of 1 v./v./hr., the temperature of the catalyst in the reactor is raised from about 650° F. to about 900° F. (i.e., within ±20° F. of 900° F.) at a generally uniform rate over a period of 2 to 3 hours. The temperature is increased to bring the reaction zone to normal reforming reaction temperatures. At the same time that the temperature is being increased, the naphtha feed rate to the reactor is gradually increased from a space velocity of about 1 v./v./hr. to a space velocity of at least 1.5 v./v./hr. Generally, in a commercial reforming unit the temperature of the catalyst in the reactor cannot be raised from 650° F. to about 900° F. in less than 2 hours because of limitations in the capacity of the furnace to heat the feed and the recycling gases. A longer period of time than 3 hours is not generally necessary in order to bring the catalyst to normal reforming temperature while still preventing a temperature runaway.

When the naphtha is contacted with the low platinum-rhenium-iridium content catalyst at a pressure of about 200 p.s.i.g. and a catalyst temperature of about 650° F., a limited amount of hydrogen is produced from, e.g., the dehydrogenation of naphthenes. The naphtha and inert gas, along with any produced hydrogen, are removed from the reactor and passed to a gas separation zone. There the inert gas and any hydrogen that was produced by reforming of the naphtha are separated from the naphtha; the inert gas and hydrogen are recycled to the reactor. Over the period of time, i.e., during the 2 to 3 hour period, at which the catalyst temperature is increased from 650° F. to 900° F., and the space velocity of the feed contacting the catalyst is increased, hydrogen is produced in increasingly greater amounts. Recirculating produced hydrogen to the treating zone results in a gradual increase in the hydrogen partial pressure. Part of the recycle gas, i.e., inert gas, and hydrogen, and any light hydrocarbon gases such as methane present in the recycle gas, is continuously discharged from the system to gradually remove substantially all the inert gas. The rate of discharge is not permitted to exceed the rate at which hydrogen is produced. Hence, the pressure in the reactor remains at at least 200 p.s.i.g. If desired the pressure can be increased considerably above 200 p.s.i.g., e.g., to 300 p.s.i.g. or higher, by the build up of autogenous pressure of produced hydrogen. The discharge of gaseous material from the system is continued at least until the hydrogen concentration is sufficient for use in the desired reforming operation. The inert gas concentration in the recycle stream and in the reactor should be decreased to less than 10 volume percent and preferably less than a 5 volume percent of the total recycle stream. This buildup of pressure of produced hydrogen occurs within the period of 2 to 3 hours during which the catalyst temperature is increased from 650° F. to 900° F.

Figure 1:
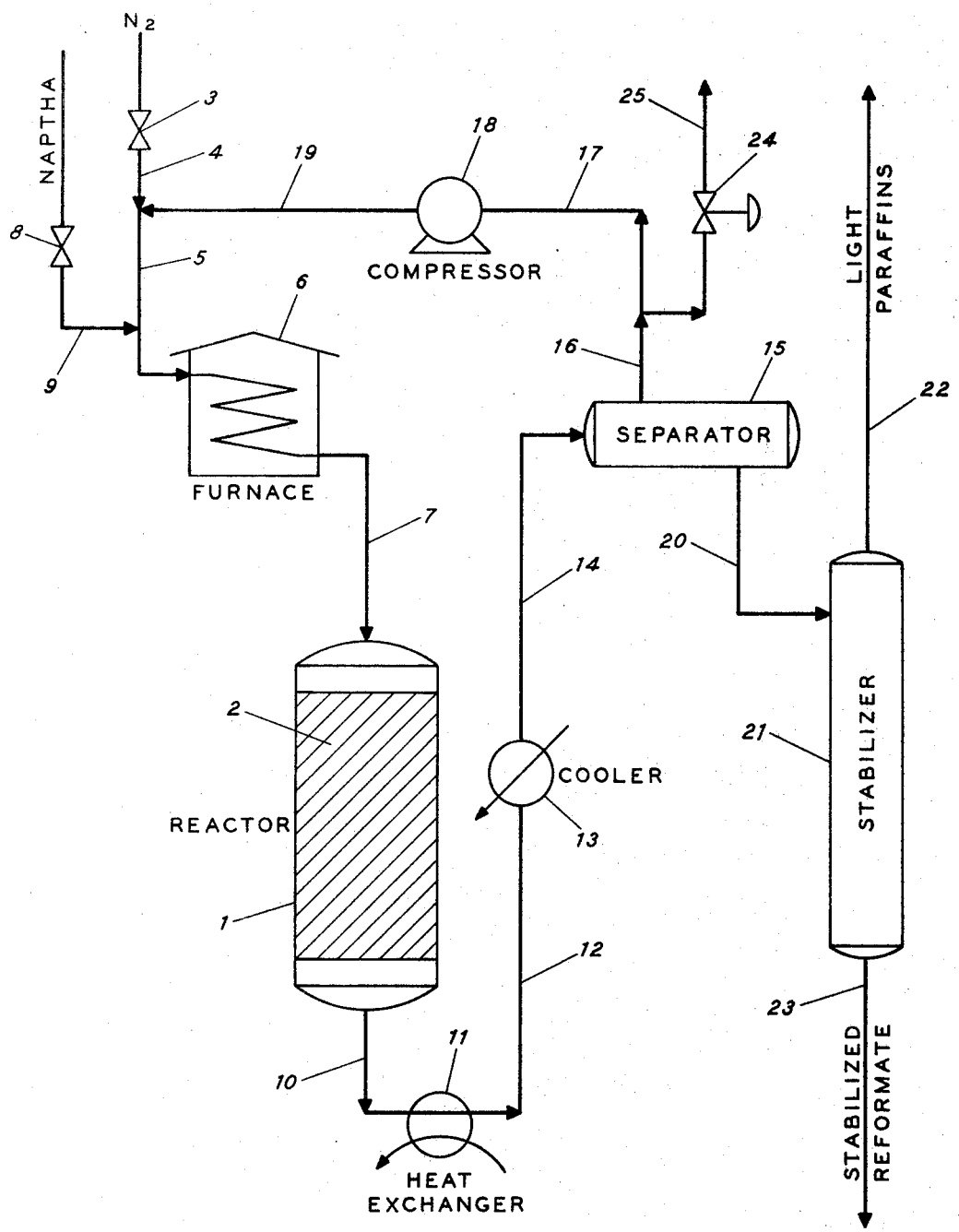
FIGURE 1 is a simplified diagram of a typical reforming system. The present process for startup of a reforming process using the low platinum-rhenium-iridium content catalyst will be more fully described by reference to the reforming system of FIGURE 1.

In order to provide a better understanding of the present invention, reference will now be made to the accompanying FIGURE 1 which contains a simplified diagram of a typical reforming unit.

A suitable reforming reactor 1 is filled with a low platinum-rhenium-iridium content catalyst 2. An inert gas, in this case nitrogen, is passed through open valve 3, through lines 4 and 5 into the furnace 6. The nitrogen is heated in furnace 6 to an elevated temperature and passed through line 7 to reactor 1 into contact with the bed of catalyst 2. Valve 8, through which naphtha feed will enter into line 9, thence to the furnace 6 and reactor 1, is closed. Nitrogen is withdrawn from reactor 1 through line 10 for recirculation to the reactor. The nitrogen withdrawn through line 10 passes through heat exchanger 11 through line 12 to a cooler 13. Thereafter nitrogen passes through line 14 to gas liquid separator 15, through line 16, line 17, compressor 18 and line 19 to line 5 where the recycled nitrogen mixes with nitrogen introduced through line 4. The reforming system is pressured to about 200 p.s.i.g. with nitrogen, and the catalyst temperature raised to about 650° F. by circulating nitrogen heated in furnace 6 through the catalyst bed 2. Thereafter, valve 3 is closed, and valve 8 opened to permit naphtha into line 9 and thence into line 5 and into furnace 6. The naphtha passes through line 7 into contact with the bed of platinum-rhenium-iridium catalyst 2 at a space velocity of about 1 v./v./hr. At the low temperature of 650° F. and in the presence of nitrogen very little reforming of the naphtha occurs. A small amount of dehydrogenation of the naphthenes does occur with the accompanying production of hydrogen. The mixture of nitrogen and naphtha and any produced hydrogen is withdrawn from reactor 1 through line 10 into heat exchanger 11. In the heat exchanger 11, the nitrogen-naphtha mixture generaly passes in indirect contact with a fresh naphtha (not shown); the heated fresh naphtha stream is then sent through line 9 and line 5 to furnace 6. The nitrogen-naphtha mixture next passes from heat exchanger 11 through line 12, cooler 13, line 14 into separator 15. The nitrogen and any produced hydrogen are separated from the naphtha in separator 15; the naphtha is removed through line 20 and passed to stabilizer 21. It may be desirable during the initial stages of contact of the naphtha with the catalyst, that is, during the period of time that little or no reforming of the naphtha occurs, to recycle naphtha from separator 15 to furnace 6 and to reactor 1 for further reforming. Means for recycling naphtha are not shown in the figure. After the reforming process is on stream any reformate removed from separator 15 is sent to stabilizer 21, the light paraffins being removed through line 22 and the stabilized reformate removed through line 23. The nitrogen and hydrogen removed from separator 15 pass through line 16, line 17, into compressor 18. The compressed gases are then recycled to furnace 6 through lines 19 and 5.

The catalyst temperature in reactor 1 is gradually increased from about 650° F. to about 900° F. over a period of 2 to 3 hours. The naphtha feed rate is gradually increased from about 1 v./v./hr. to at least 1.5 v./v./hr. over the same period. As the temperature is gradually increased, hydrogen is produced in greater amounts; hydrogen withdrawn from reactor 1 is recycled to the reactor. The nitrogen concentration in the recycle gases is gradually decreased over a period of about 2 to 3 hours by bleeding off or discharging part of the recycle stream from the reforming system through line 25 by opening valve 24. The rate at which the gases are withdrawn is not permitted to exceed the rate at which hydrogen is produced. The hydrogen pressure is allowed to build up over a period of 2 to 3 hours while maintaining a total pressure in the reaction zone of at least 200 p.s.i.g. Normally, at the end of the 2 to 3 hours period of bringing the catalyst temperature and reactor pressure to the desired level for reforming, substantially all the nitrogen should have been discharged from the system and reforming of the naphtha in the presence of hydrogen should be occurring.

By means of the startup procedure described by reference to FIGURE 1, a temperature excursion in the catalyst bed will have been substantially eliminated.

The feedstock to be employed in the reforming operation is a light hydrocarbon oil, for example, a naphtha fraction. Generally, the naphtha will boil in the range falling within the limits of from 70 to 550° F. and preferably 150 to 450° F. The feedstock can be either a straight-run naphtha or a thermally cracked or catalytically cracked naphtha or blends thereof. Preferably the feed should be substantially free of sulfur, that is, the feed should preferably contain less than about 10 p.p.m. sulfur, more preferably less than 5 p.p.m. sulfur, and still more preferably less than 1 p.p.m. sulfur. The sulfur content is determined as weight of sulfur to weight of feed.

In the case of a feedstock which is not already low in sulfur, acceptable levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support with a minor proportion of molybdenum oxide and cobalt oxide. Hydrodesulfurization is ordinarily conducted at a temperature of from 700 to 850° F., a pressure of from 200 to 2000 p.s.i.g., and a liquid hourly space velocity of from 1 to 5. The sulfur contained in the naphtha is converted to hydrogen sulfide which can be removed prior to reforming by suitable conventional processes.

In a reforming process to convert a naphtha to high octane gasoline using the present invention as a start-up procedure, the reforming conditions for converting the naphtha to high octane gasoline can be varied over wide ranges depending on, among others, the feed used, and the desired octane rating of the product. The temperature in the reforming operation will generally be within the range of about 600° to 1100° F. and preferably about 700° to 1050° F. The pressure in the reforming reaction zone can be superatmospheric, atmospheric or subatmospheric; however, the pressure will generally lie within the range from about 25 to 1000 p.s.i.g., preferably from about 50 to 750 p.s.i.g. The temperature and pressure can be correlated with the liquid hourly space velocity to favor any particularly desirable reforming reaction, as for example, aromatization, isomerization or dehydrogenation. In general the LHSV will be from 0.1 to 10, preferably from 1 to 5. The hydrogen to hydrocarbon mole ratio is preferably from about 0.5 to 20. During the reforming process the hydrogen can be in admixture with light gaseous hydrocarbons.

The process of the present invention can be better understood by reference to the following example.

EXAMPLE

A catalyst comprising about 0.2 weight percent platinum, about 0.1 weight percent rhenium and about 0.025 weight percent iridium associated with alumina was used for reforming a hydrofined catalytically cracked naphtha having an initial boiling point of 151° F., an end boiling point of 420° F., and a 50 percent boiling point of 307° F. The research octane number of the naphtha without antiknock additives (F–1 clear) was 64.6. The naphtha contained less than 0.1 p.pm. sulfur. The reforming process was started up in the presence of nitrogen in accordance with the present process. Thus, after placing the catalyst in a reactor, and following reduction, nitrogen was circulated through the reforming system, including the reactor, to pressurize the reforming system to about 200 p.s.i.g. The catalyst was also heated to a temperature of about 650° F. Thereafter the hydrofined catalytically cracked naphtha was contacted with the catalyst in the reactor at a space rate of about 1. v./v./hr. A naphtha-nitrogen mixture containing any produced hydrogen was withdrawn from the reactor, and passed to a gas separation zone wherein nitrogen and any produced hydrogen was separated from the naphtha. The nitrogen and any produced hydrogen was recycled to the reaction zone. The temperature of the catalyst in the reactor was raised from about 650° F. to about 900° F. at a generally uniform rate over a period of about 2 to 3 hours. The naphtha feed rate was increased over the same period from about 1 v./v./hr. to at least 1.5 v./v./hr. Hydrogen produced by the reforming of the naphtha was recycled to the reaction zone. The pressure in the reaction zone was gradually increased by buildup of autogeneous pressure of produced hydrogen over a period of 2 to 3 hours until a level of about 300 p.s.i.g. was reached. The nitrogen in the recycling gas was decreased as hydrogen was produced by discharging part of the recycle gas from the reforming system. The reforming process was then conducted at a space velocity of at least 1.5 v./v./hr., a pressure of 300 p.s.i.g. and a hydrogen to hydrocarbon mole ratio of 4. A gasoline product having a 100 F–1 clear octane rating was produced.

No temperature excursion was observed using the startup process of the present invention. Generally, when a naphtha is introduced to a catalytic reaction zone containing a supported low platinum-rhenium-iridium content catalyst at reforming conditions without a careful startup to reduce the hydrocracking activity of the catalyst, a temperature excursion or heat front travels through the catalyst bed. The temperature in the bed may increase as high as several hundred degrees above the temperature of the naphtha introduced to the reaction zone. Such a severe temperature increase can damage the reactor and/or catalyst. The startup procedure of the present invention eliminates or substantially reduces this heat front.

For comparison purpose a reforming process using a catalyst comprising about 0.2 weight percent platinum, about 0.1 weight percent rhenium and about 0.025 weight percent iridium supported on alumina was started up in the presence of hydrogen. That is, a hydrofined catalytically cracked naphtha (described above for the startup process using nitrogen) was contacted directly with the catalyst in the presence of hydrogen at a catalyst temperature of about 650° F. and a pressure of about 200 p.s.i.g. Thereafter the temperature of the catalyst and pressure of the reforming system were gradually increased over about a 2 to 3 hour period to the temperature and pressure necesary to produce 100 F-1 clear octane gasoline. The feed was contacted initially with the catalyst at a space rate of about 1 v./v./hr., but was increased to at least 1.5 v./v./hr. over the period of time during which the temperature and pressure were being increased. The conditions used in the reforming process using the catalyst included a pressure of 300 p.s.i.g., a space velocity at least 1.5 v./v./hr., and a hydrogen to hydrocarbon mole ratio of 4. A 100 F-1 clear octane product was produced throughout the run.

FIGURE 2 is a graph of the average catalyst temperatures necessary to produce 100 F-1 clear octane gasoline for the reforming processes started up by the different procedures. The average catalyst temperatures are shown as a function of on stream times. Curve 1 shows the average catalyst temperatures required to produce 100 F-1 clear product in the reforming process using the hydrogen startup procedure. Curve 2 shows the average catalyst temperatures necessary to produce 100 F-1 clear octane product in a reforming process started up by the procedure of the present invention. The temperatures required to maintain a 100 F-1 clear octane product are significantly lower for the process using the startup method of the present invention than for the reforming process using a hydrogen startup. Furthermore, the reforming process using the startup process of the present invention has a lower fouling rate (the temperature increase necessary to maintain the 100 F-1 clear product) than the process using the hydrogen startup.

The curves in FIGURE 3 show the C$_5$+ liquid product yield, measured as volume percent of the total product, as a function of onstream time. Curve 1 is for the reforming process started up in hydrogen. Curve 2 is for the reforming process started up by means of the present invention. The reforming process using the nitrogen startup in accordance with the present invention (curve 2) shows a significantly improved yield stability as compared to the reforming process started up in hydrogen (curve 1).

The foregoing disclosure of the present inention is not to be considered limiting since many variations can be made by those skilled in the art without departing from the scope or spirit of the appended claims.

What is claimed is:

1. A method for startup of a reforming process using a reforming catalyst comprising a porous solid carrier having 0.01 to 0.3 weight percent platinum, 0.01 to 0.3 weight percent rhenium and 0.001 to 0.1 weight percent iridium associated therewith, which comprises introducing said catalyst into a reaction zone, pressuring said reaction zone with an inert gas to about 200 p.s.i.g., heating said catalyst to about 650° F., contacting said catalyst with a substantially sulfur-free naphtha at a space rate of about one volume of naphtha per volume of catalyst per hour, withdrawing a mixture of naphtha and inert gas from said reaction zone and passing said mixture into a gas-separation zone to separate inert gas from naphtha, withdrawing naphtha from said separation zone and recycling inert gas to said reaction zone, raising the temperature of said catalyst in said reaction zone from about 650° F. to about 900° F. at a generally uniform rate over a period of about 2 to 3 hours, gradually increasing the naphtha feed rate to said reaction zone at a generally unform rate over a period of 2 to 3 hours until a space velocity of at least 1.5 volumes of naphtha per volume of catalyst per hour is reached, and gradually decreasing the flow of inert gas into said reaction zone while building up autogenous pressure of produced hydrogen over a period of 2 to 3 hours to maintain a pressure in said reaction zone of at least about 200 p.s.i.g.

2. The process of claim 1 wherein said inert gas is nitrogen.

3. The process of claim 1 wherein said catalyst is in a reduced state prior to contact with said naphtha and inert gas.

References Cited

UNITED STATES PATENTS

| | | | |
|---|---|---|---|
| 2,848,377 | 8/1958 | Webb | 208—138 |
| 2,880,161 | 3/1959 | Moore et al. | 208—65 |
| 2,902,434 | 9/1959 | Burton et al. | 208—134 |
| 2,939,847 | 6/1960 | Smith et al. | 208—139 |
| 3,000,809 | 9/1961 | Ridgway et al. | 208—65 |
| 3,296,118 | 1/1967 | Czaskowski et al. | 208—138 |
| 3,309,306 | 3/1967 | MacLaren | 208—138 |
| 3,415,737 | 12/1968 | Kluksdahl | 208—138 |

HERBERT LEVINE, Primary Examiner

U.S. Cl. X.R.

252—461, 466